(12) United States Patent
Filsfils et al.

(10) Patent No.: US 9,450,829 B2
(45) Date of Patent: Sep. 20, 2016

(54) SEAMLESS SEGMENT ROUTING

(71) Applicant: Cisco Technology, Inc., San Jose, CA (US)

(72) Inventors: Clarence Filsfils, Brussels (BE); David D. Ward, Los Gatos, CA (US); Stewart F. Bryant, Redhill (GB); Daniel C. Frost, Feltham (GB); Nagendra Kumar Nainar, Bangalore (IN); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 14/210,837

(22) Filed: Mar. 14, 2014

(65) Prior Publication Data

US 2014/0269699 A1    Sep. 18, 2014

Related U.S. Application Data

(60) Provisional application No. 61/791,242, filed on Mar. 15, 2013.

(51) Int. Cl.
| | | |
|---|---|---|
| *H04L 12/723* | (2013.01) | |
| *H04L 12/715* | (2013.01) | |
| *H04L 12/24* | (2006.01) | |
| *H04L 12/721* | (2013.01) | |
| *H04L 12/741* | (2013.01) | |

(52) U.S. Cl.
CPC ............... *H04L 41/12* (2013.01); *H04L 45/04* (2013.01); *H04L 45/12* (2013.01); *H04L 45/46* (2013.01); *H04L 45/50* (2013.01); *H04L 45/507* (2013.01); *H04L 45/74* (2013.01); *H04L 45/745* (2013.01); *H04L 45/54* (2013.01)

(58) Field of Classification Search
CPC .............................. H04L 45/50; H04L 45/46
See application file for complete search history.

(56) References Cited

U.S. PATENT DOCUMENTS

| | | | |
|---|---|---|---|
| 6,032,197 A | 2/2000 | Birdwell et al. | 709/216 |
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |

(Continued)

OTHER PUBLICATIONS

Previdi et al, Segment routing with IS-IS routing protocol, Mar. 12, 2013, all pages.*

(Continued)

*Primary Examiner* — Brandon Renner
(74) *Attorney, Agent, or Firm* — Campbell Stephenson LLP (57) ABSTRACT

In one embodiment, a packet and a segment ID stack is received at a node. The segment ID stack includes a plurality of segment IDs, one or which is a first area-segment ID that identifies a first area of a subdivided network. One of a plurality of forwarding tables at the node is selected based on the first area-segment ID. Thereafter, the packet is forwarded based on information contained in the selected forwarding table.

19 Claims, 8 Drawing Sheets

(56) References Cited

U.S. PATENT DOCUMENTS

| | | | |
|---|---|---|---|
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/389 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,709 B2 | 9/2013 | Kim et al. | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1 | 2/2015 | Aggarwal | 370/389 |
| 9,036,474 B2 | 5/2015 | Dibirdi et al. | 370/235 |
| 9,112,734 B2 | 8/2015 | Edwards et al. | |
| 9,118,572 B2 | 8/2015 | Sajassi | |
| 2001/0037401 A1 | 11/2001 | Soumlya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl, Jr. et al. | 709/230 |
| 2003/0142674 A1 | 7/2003 | Casey | 370/393 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2005/0213051 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0262735 A1* | 11/2006 | Guichard | H04L 12/66 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Slerekl | 370/351 |
| 2007/0058638 A1 | 3/2007 | Guichard | 370/395.31 |
| 2007/0189291 A1 | 8/2007 | Tian | 370/390 |
| 2008/0002699 A1 | 1/2008 | Rajsic | 370/392 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Goode | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0135815 A1 | 5/2009 | Pacella | 370/389 |
| 2010/0063983 A1 | 3/2010 | Groarke et al. | 707/803 |
| 2010/0088717 A1* | 4/2010 | Candelore | H04N 21/234309 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0284309 A1 | 11/2010 | Allan et al. | 370/256 |
| 2011/0228780 A1 | 9/2011 | Ashwood-Smith | 370/392 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0069740 A1 | 3/2012 | Lu et al. | 370/238 |
| 2012/0069845 A1 | 3/2012 | Carnet et al. | 370/392 |
| 2012/0082034 A1 | 4/2012 | Vasseur | 370/235 |
| 2012/0120808 A1 | 5/2012 | Nandagopal et al. | 370/238 |
| 2012/0213225 A1 | 8/2012 | Subramanian et al. | 370/392 |
| 2012/0218884 A1 | 8/2012 | Kini | 370/228 |
| 2012/0307629 A1 | 12/2012 | Vasseur et al. | 370/228 |
| 2013/0003728 A1 | 1/2013 | Kwong et al. | 370/389 |
| 2013/0077476 A1 | 3/2013 | Enyedi et al. | 370/225 |
| 2013/0077626 A1 | 3/2013 | Keesara et al. | 370/390 |
| 2013/0142052 A1 | 6/2013 | Burbidge et al. | 370/242 |
| 2013/0188634 A1 | 7/2013 | Magee | 370/389 |
| 2013/0219034 A1 | 8/2013 | Wang | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |
| 2014/0169370 A1 | 6/2014 | Filsfils et al. | 370/392 |
| 2014/0177638 A1 | 6/2014 | Bragg et al. | 370/395.3 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0341222 A1 | 11/2014 | Filsfils et al. | 370/395.5 |
| 2014/0369356 A1 | 12/2014 | Bryant et al. | 370/392 |

OTHER PUBLICATIONS

Cisco Systems, Inc., "Introduction to Intermediate System-to-Intermediate System Protocol," published 1992-2002; pp. 1-25.
Eckert, T., "Traffic Engineering for Bit Index Explicit Replication BIER-TE, draft-eckert-bier-te-arch-00," Network Working Group, Internet—Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet—Draft, Jul. 5, 2015, pp. 1-23.
Eckert, Toerless et al., "Traffic Engineering for Bit Indexed Explicit Replication", U.S. Appl. No. 14/814,574, filed Jul. 31, 2015.
Eckert, Toerless et al., "Traffic Engineering for Bit Indexed Explicit Replication", U.S. Appl. No. 14/862,915, filed Sep. 23, 2015.
Francois, Pierre Jean Rene; "Loop Avoidance During Network Convergence in Switched Networks"; U.S. Appl. No. 14/319,353, filed Jun. 30, 2014.
Previdi, Stefano B.; "Segment Routing Using a Remote Forwarding Adjacency Identifier"; U.S. Appl. No. 14/334,300, filed Jul. 17, 2014.
Previdi, Stefano B; "Segment Routing Extension Headers"; U.S. Appl. No. 14/212,084, filed Mar. 14, 2014.
Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.
Awduche, Daniel O., et al., "RSVP-TE: Extensions to RSVP for LSP Tunnels," Network Working Group, Internet-Draft, Aug. 2000, pp. 1-12.
Awduche, Daniel O., et al., "RSVP-TE: Extensions to RSVP for LSP Tunnels," Network Working Group, Request for Comments 3209, Dec. 2001, pp. 1-61.
Backes, P. and Rudiger Geib, "Deutsche Telekom AG's Statement About IPR Related to Draft-Geig-Spring-OAM-Usecase-01," Feb. 5, 2014, pp. 1-2.

(56) References Cited

OTHER PUBLICATIONS

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-12.
Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.
Deering, S., et al., Cisco, Internet Protocol, Version 6 (IPv6) Specification, Network Working Group, Request for Comments 2460, Dec. 1998, pp. 1-39.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol-Traffic Enginerring (RSVP-TE) Extensions, Network Working Group, Request for Comments 5151, Feb. 2008, pp. 1-25.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013, pp. 1-28.
Filsfils, C., et al., Cisco Sytems, Inc., "Segment Routing Architecture," draft-filsfils-rtgwg-segment-routing-01, Network Working Group, Internet-Draft, Oct. 21, 2013, pp. 1-28.
Filsfils, C. et al., Cisco Systems, Inc., "Segment Routing Interoperability with LDP", draft-filsfils-spring-segment-routing-ldp-interop-01.txt; Apr. 18, 2014, pp. 1-16.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case," IETF 87, Berlin, Jul./Aug. 2013, pp. 1-3.
Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.
Geib, R., Deutsch Telekom, "Use Case for a Scalable and Topology Aware MPLS Data Plan Monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-fliisfits-isis-segment-routing-00," IS-IS for IP Internets, Internet-Draft, Mar. 12, 2013, pp. 1-27.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Previdi, S. et al., Cisco Systems, Inc., "Segment Routing with IS-IS Routing Protocol, draft-previdi-filsfils-isis-segment-routing-02," Internet-Draft, Mar. 12, 2013, pp. 1-27.
Rosen, E. et al., Cisco Systems, Inc., "BGP/MPLS VPNs", Network Working Group, Request for Comments: 2457; Mar. 1999, pp. 1-26.
Eckert Toerless et al., "Failure Protection for Traffic-Engineered Bit Indexed Explicit Replication", U.S. Appl. No. 15/054,480, filed Feb. 26, 2016.
Li, T., et al., Redback Networks, Inc., "IS-IS Extensions for Traffic Engineering," Network Working Group, Request for Comments 5305, Oct. 2008, 17 pages.
Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

* cited by examiner

SEAMLESS SEGMENT ROUTING

RELATED APPLICATIONS

This application claims the domestic benefit under Title 35 of the United States Code §119(e) of U.S. Provisional Patent Application Ser. No. 61/791,242, entitled "Segment Routing," filed Mar. 15, 2013, which is hereby incorporated by reference in its entirety and for all purposes as if completely and fully set forth herein.

BACKGROUND

Network nodes forward packets using forwarding tables. Network nodes may take form in one or more routers, one or more bridges, one or more switches, one or more servers, or any other suitable communications processing device. A packet is a formatted unit of data that typically contains control information and payload data. Control information may include: source and destination IP addresses, error detection codes like checksums, sequencing information, etc. Control information is typically found in packet headers and trailers, with payload data in between.

Packet forwarding requires a decision process that, while simple in concept, can be complex. Since packet forwarding decisions are handled by nodes, the total time required for this can become a major limiting factor in overall network performance.

Multiprotocol Label Switching (MPLS) is one packet forwarding mechanism. MPLS Nodes make packet forwarding decisions based on Label Distribution Protocol (LDP) labels attached to packets and LDP forwarding tables. LDP is a process in which network nodes capable of MPLS exchange LDP labels (hereinafter labels). Packet forwarding based on labels stands in stark contrast to traditional Internet Protocol (IP) routing in which packet forwarding decisions are made by nodes using IP addresses contained within the packet.

DETAILED DESCRIPTION

1. Overview

An apparatus and method is disclosed for seamless segment routing (SR). In one embodiment, a packet and a segment ID stack is received at a node. The segment ID stack includes a plurality of segment IDs, one of which is a first area-segment ID that identifies a first area of a subdivided network. One of a plurality of forwarding tables at the node is selected based on the first area-segment ID. Thereafter, the packet is forwarded based on information contained in the selected forwarding table.

2. Packet Forwarding Mechanisms

IP routing and MPLS are distinct packet forwarding mechanisms. IP routing uses IP addresses inside packet headers to make packet forwarding decisions. In contrast, MPLS implements packet forwarding decisions based on short path identifiers called labels attached to packets. Segment routing (SR) is yet another packet forwarding mechanism. SR is similar to MPLS in many regards. For example, packet forwarding decisions in SR can be based on short path identifiers called segment IDs attached to packets. However, substantial differences exist between SR and MPLS as will be more fully described below.

2.1 IP Routing

IP routing uses IP forwarding tables, which are created at nodes using routing information distributed between nodes via one or more protocols like the internal gateway protocol (IGP) and/or the border gateway protocol (BGP). In simple terms, IP forwarding tables map destination addresses to the next hops that packets take to reach their destinations. When a node receives a packet, the node can access a forwarding table using the destination address in the packet and lookup a corresponding egress interface for the next hop. The node then forwards the packet through the egress interface. The next hop that receives the packet performs its own forwarding table lookup using the same destination IP address, and so on.

2.2 MPLS and LDP

MPLS is commonly employed in provider networks. Packets enter an MPLS network via an ingress edge node, travel hop-by-hop along a label-switched path (LSP) that typically includes one or more core nodes, and exit via an egress edge node.

Packets are forwarded along an LSP based on labels and LDP forwarding tables. Labels allow for the use of very fast and simple forwarding engines in the data plane of nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for network-based virtual private networks, etc. In many ways, LSPs are no different than circuit-switched paths in ATM or Frame Relay networks, except that they are not dependent on a particular Layer 2 technology.

LDP is employed in the control planes of nodes. Two nodes, called LDP peers, can bi-directionally exchange labels on a FEC by FEC basis. LDP can be used in a process of building and maintaining LDP forwarding tables that map labels and next hop egress interfaces. These forwarding tables can be used to forward packets through MPLS networks as more fully described below.

When a packet is received by an ingress edge node of an MPLS network, the ingress node may determine a corresponding FEC. Characteristics for determining the FEC for a packet can vary, but typically the determination is based on the packet's destination IP address. Quality of Service for the packet or other information may also be used to determine the FEC. Once determined, the ingress edge node can access a table to select a label that is mapped to the FEC. The table may also map a next hop egress interface to the FEC. Before the ingress edge node forwards the packet to the next hop via, the ingress node attaches the label.

Figure 1:
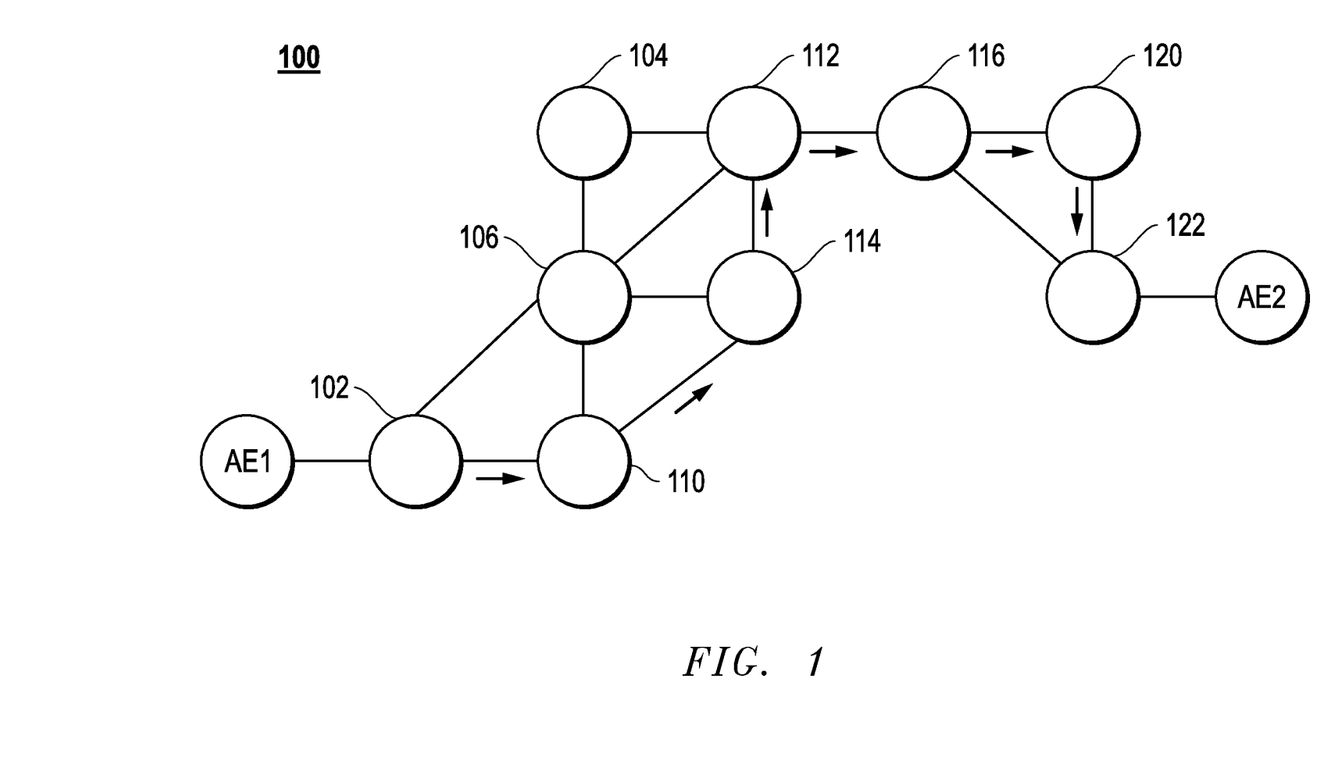
FIG. 1 is a block diagram illustrating an example provider network.

When a node receives a packet with an attached label (i.e., the incoming label), the node accesses an LDP forwarding table to read a next hop egress interface and another label (i.e., an outgoing label), both which are mapped to the incoming label. Before the packet is forwarded via the egress interface, the node swaps the incoming label with the outgoing label. The next hop receives the packet with label and may perform the same process. This process is often called hop-by-hop forwarding along a non-explicit path. The penultimate node in the LSP may pop or remove the incoming label before forwarding the packet to an egress edge node in the network, which in turn may forward the packet towards its destination using the packet's destination address and an IP forwarding table. To illustrate MPLS aspects, FIG. 1 shows a portion of an example MPLS network 100 that includes nodes 102-122 coupled together via communication links. An LSP from node 102 to node 122 can be created so that all packets of a stream associated with a particular FEC sent from node 102 to node 122 will travel through the same set of nodes. Each node maintains information for the LSP established through it in an LDP forwarding table. Thus, if node 110 knows that node 114 is the next hop along the LSP for all packets received from node 102 that are destined for node 122, node 110 can forward the packets to node 114.

2.3 Segment Routing

Segment routing (SR) is a mechanism in which nodes forward packets using SR forwarding tables and segment IDs Like MPLS, SR enables very fast and simple forwarding engines in the data plane of nodes. SR is not dependent on a particular Open Systems Interconnection (OSI) model data link layer technology to forward packets.

SR nodes (i.e., nodes employing SR) make packet forwarding decisions based on segment IDs as opposed to labels, and as a result SR nodes need not employ LDP in their control planes. Unless otherwise indicated, the SR nodes described below lack LDP in the control plane.

Packets can enter an SR enabled network (i.e., a network of nodes that are SR enabled) via an ingress edge node, travel hop-by-hop along a segment path (SP) that includes one or more core nodes, and exit the network via an egress edge node.

Like labels, segment IDs are short (relative to the length of an IP address or a FEC), fixed-length identifiers. Segment IDs may correspond to topological segments of a network, services provided by network nodes, etc. Topological segments represent one hop or multi hop paths to SR nodes. Topological segments act as sub-paths that can be combined to form an SP. Stacks of segment IDs can represent SPs, and SPs can be associated with FECs as will be more fully described below.

There are several types of segment IDs including nodal-segment IDs, adjacency-segment IDs, etc. Nodal-segment IDs are assigned to nodes so that no two SR nodes belonging to a network domain are assigned the same nodal-segment ID. Nodal-segment IDs can be mapped to unique SR node identifiers such as node loopback IP addresses (hereinafter node loopbacks). In one embodiment, all assigned nodal-segment IDs are selected from a predefined ID range (e.g., [32, 5000]). A nodal-segment ID corresponds to a one-hop or a multi-hop, shortest path (SPT) to an SR node assigned the nodal-segment ID as will be more fully described below.

An adjacency-segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs are unique. Link IDs should not be confused with adjacency-segment IDs; adjacency-segment IDs may not be unique within a network. This disclosure will presume that only one link exists between nodes in a network, it being understood the present disclosure should not be limited thereto.

Each SR node can assign a distinct adjacency-segment ID for each of the node's links. Adjacency-segment IDs are locally significant; separate SR nodes may assign the same adjacency-segment ID, but that adjacency-segment ID represents distinct links. In one embodiment, adjacency-segment IDs are selected from a predefined range that is outside the predefined range for nodal-segment IDs.

SR nodes can advertise routing information including nodal-segment IDs bound to loopbacks, adjacency-segment IDs mapped to link IDs, etc., using protocols such as IGP and/or BGP with SR extension. Nodes can use the routing information they receive to create or update SR forwarding tables. To illustrate, SR nodes may use the routing information they receive in order to create topology maps of the network, which in turn can be used to identify next hop egress interfaces of shortest paths (SPTs) to respective node loopbacks. The identified SPT or next hop egress interfaces are then mapped to respective nodal-segment IDs in an SR forwarding table. Nodes can also map their adjacency-segment IDs to egress interfaces for respective links in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID should be the only node in the network area that has a SR forwarding table that maps the adjacency-segment ID to an egress interface.

As noted above, SR enables segment paths (SPs), which can be used for transporting packets through a network. SPs can be associated with FECs, and can be established for a variety of purposes. Packets associated with the same FEC normally traverse the same SP towards their destination. Nodes in SPs make forwarding decisions based on segment IDs, not based on the contents (e.g., destination IP addresses) of packets. As such, packet forwarding in SPs is not dependent on a particular Layer 2 technology.

Edge nodes and/or other devices (e.g., a centralized control plane server) of an SR network use routing information (nodal-segment IDs bound to loopbacks, adjacency-segment IDs mapped to link IDs, etc.) they receive in link advertisements to create ordered lists of segment IDs (i.e., segment ID stacks). Segment ID stacks correspond to respective SPs. Individual segment IDs in a stack may correspond to respective segments or sub paths of a corresponding SP.

When an SR ingress edge node receives a packet, the node or a centralized control plane server in data communication with the node, can select an SP for the packet based on information contained in the packet. In one embodiment, a FEC may be calculated for the packet using the packet's destination address. The FEC is then used to select a segment ID stack mapped thereto. The ingress edge node can attach the selected segment ID stack to the packet via an SR header. The packet with attached stack is forwarded along and can traverse the segments of the SP in an order that corresponds to the list order of the segment IDs in the stack. A forwarding engine operating in the data plane of each SR node can use the top segment ID within the stack to look up the egress for next hop. As the packet and attached segment ID stack are forwarded along the SP in a hop-by-hop fashion, segment IDs can be popped off the top of the stack. In another embodiment, the attached stack of segment IDs remains unchanged as the packet is forwarded along the SP. In this embodiment, a pointer to an active segment ID in the stack can be advanced as the packet is forwarded along the SP. In contrast to MPLS, however, segment IDs are typically not swapped as the packet and attached segment ID stack are forwarded along the SP.

Figure 2:
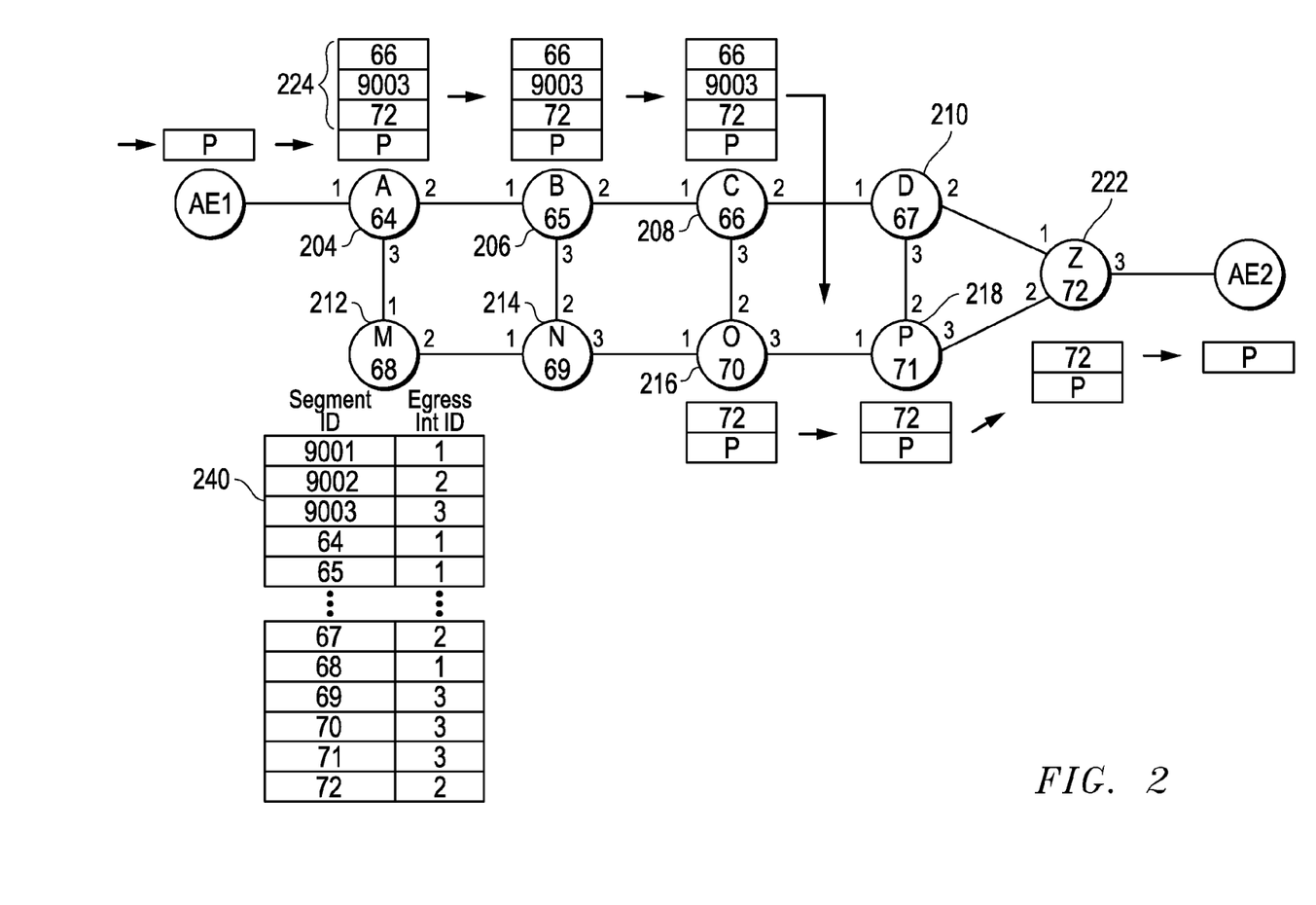
FIG. 2 is a block diagram illustrating an example provider network.

To illustrate general concepts of SR, FIG. 2 shows an example SR enabled provider network that is in data communication with access network nodes AE1 and AE2. Network 202 consists of SR nodes 204-222. Nodes 204-210 are assigned unique nodal-segment IDs 64-67, respectively, nodes 212-218 are assigned unique nodal-segment IDs 68-71, respectively, and node 222 is assigned unique nodal-segment ID of 72. Each of the SR nodes 204-222 have interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, and loopback Z is assigned to node 222. These loopbacks are unique in the network and can be used for several purposes such as calculating the topology of network 202, which in turn can be used to create SPs and/or to identify SPTs and thus next hop egress interfaces for SR forwarding tables. Nodes 204-222 can also assign locally significant adjacency-segment IDs. For example, node 208 can assign adjacency-segment IDs 9001-9003 to links CB, CD, and CO, respectively.

Each of SR nodes 204-222 can advertise routing information to the other nodes in network 202 using IGP with SR extension. For example, node 208 can generate and send one or more link state advertisements that include adjacency-segment IDs 9001-9003 bound to link IDs CB, CD, and CO, respectively, and nodal-segment ID 66 bound to loopback C. One of ordinary skill understands that link state advertisements may contain additional information. Using the advertisements they receive, the control planes of nodes 204-222 can generate respective SR forwarding tables for use in the data planes. For example, node 208 can generate example SR forwarding table 240 that maps adjacency-segment IDs 9001-9003 to node interface IDs 1-3, respectively, and nodal-segment IDs such as 64, 65, 67, 70, and 72, to node 208 interfaces 1, 1, 2, 3, and 2, respectively, which are the SPT next hop egress interfaces determined by node 208 for loopbacks A, B, D, O, and Z respectively. It is noted that in the embodiment shown, only SR forwarding table 240 maps adjacency-segment IDs 9001-9003 to interfaces; SR forwarding tables in the other nodes of network 202 should not map adjacency-segment IDs 9001-9003.

In addition to creating SR forwarding tables based on received segment ID advertisements, SR nodes or a centralized control plane server (not shown) can create segment ID stacks for respective SPs. For example, ingress edge node 204 creates example segment ID stack 224 for an SP between ingress edge node 204 and egress edge node 222. Example segment stack 224 can be created for a particular FEC (e.g., FEC F). Example stack 224 includes three segment IDs: nodal-segment IDs 66 and 72 advertised by nodes 208 and 222, respectively, and adjacency-segment ID 9003 advertised by node 208. Stack 224 corresponds to an SP in which packets flow in order through nodes 204, 206, 208, 216, 218, and 222.

In response to receiving a packet from access node AE1, SR node 204 or a centralized control plane server (not shown) can select a segment ID stack based on information contained in the packet. For example, node 204 can calculate FEC F for a received packet P based on the destination IP address in packet P. FEC F is mapped to example stack 224 in a table not shown. Node 204 attaches stack 224 to packet P. Example segment stack 224 lists segment IDs that correspond to one hop and multi hop segments that packets traverse to reach egress edge node 222. The segments collectively form the SP corresponding to stack 224. Once the segment stack 224 is attached to packet P, ingress SR enable node 204 may access a SR forwarding table (not shown) using the top segment ID (e.g., segment ID=66) to read egress interface identifier 2, which is the next hop egress interface for the SPT to the SR node assigned nodal-segment ID 66.

Figure 3:
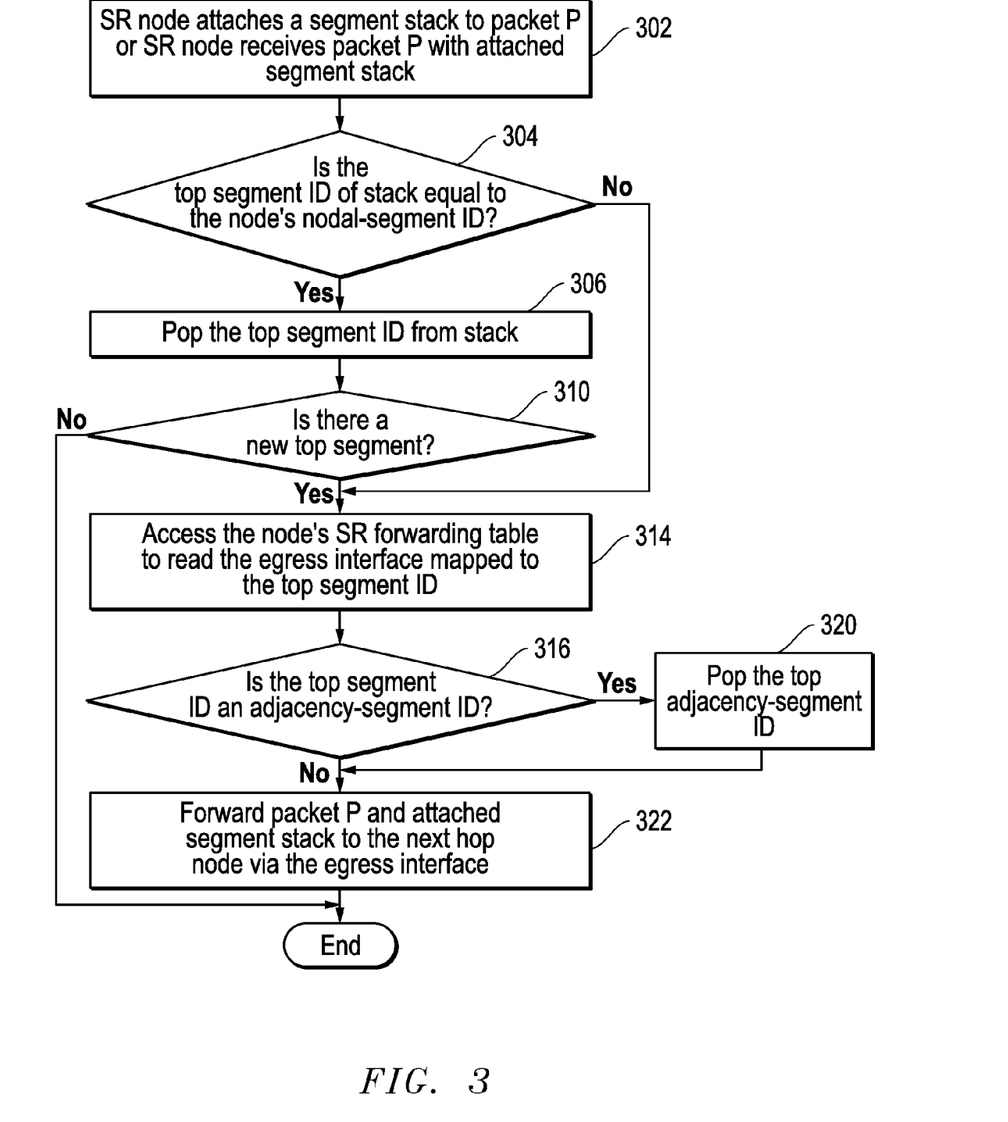
FIG. 3 is a flow chart illustrating an example process employed by a node of the network shown in FIG. 2.

With continuing reference to FIG. 2, FIG. 3 illustrates an example process of packet forwarding using segment IDs according to one embodiment. More particularly, FIG. 3 illustrates an example method performed by an SR node, including an edge node, in a network like that shown in FIG. 2. In response to receiving a packet with an attached segment ID stack, or in response to attaching a segment ID stack to a packet, the SR node determines in step 304 whether the top segment ID of the stack matches the nodal-segment ID assigned to the SR node. If there is a match, the process proceeds to step 306 where the SR node pops the top segment ID, which may expose an underlying segment ID as the new top segment ID. If there is no new top segment ID (i.e., the segment popped in 306 was the last segment ID of the stack) the packet P has arrived at the egress edge node, and the process ends. If a new top segment ID is exposed, or if there is no match of segment IDs in step 304, the SR node accesses its SR forwarding table in step 314 to read the egress interface that is mapped to the top segment ID. In step 316 the SR node determines whether the top segment ID is an adjacency-segment ID. This determination can be implemented by simply comparing the top segment ID with the designated range of adjacency-segment IDs that are available for assignment within the network. If the top segment ID is found to be within the designated range, the top segment ID is an adjacency-segment ID and it is popped. In step 322 the SR node forwards packet P and attached stack to the next node via the egress interface identified in step 314.

With continuing reference to FIG. 3, FIG. 2 shows packet P and attached stack 224 as it is forwarded by nodes. As shown, nodes 204 and 206 forward packet P and stack 224 without popping a segment ID. However, node 208 pops nodal-segment ID 66 and adjacency-segment ID 9003 in accordance with steps 306 and 320, respectively, before the packet P and stack 224 are forwarded to node 216 in accordance with step 322. Nodes 216 and 218 forward packet P and stack 224 without popping segment IDs. SR egress edge node 222 recognizes itself as the last hop of the SP. Eventually, node 222 may employ traditional IP routing and forward packet P to access node AE2 based on routing table lookup using the destination IP address within packet P.

3. Inter Area Segment Routing

A provider network may be subdivided into areas to simplify administration and optimize resource utilization.

An area consists of nodes that have been administratively grouped together into an IGP domain. A backbone area typically forms the core of a subdivided network. Additional areas are connected to the backbone and referred to herein as aggregation areas. Nodes that are totally within an area are called internal nodes. All interfaces of internal nodes are directly connected to nodes within the area. Area border nodes have interfaces that are directly coupled to at least one node in the backbone area and at least one node in a connected aggregation area. Area border nodes can be viewed as being contained in more than one area. Inter-area packet forwarding happens via area border nodes. Edge nodes in aggregation areas may be connected to nodes (e.g., access network nodes) that are external to the subdivided provider network.

Figure 4:
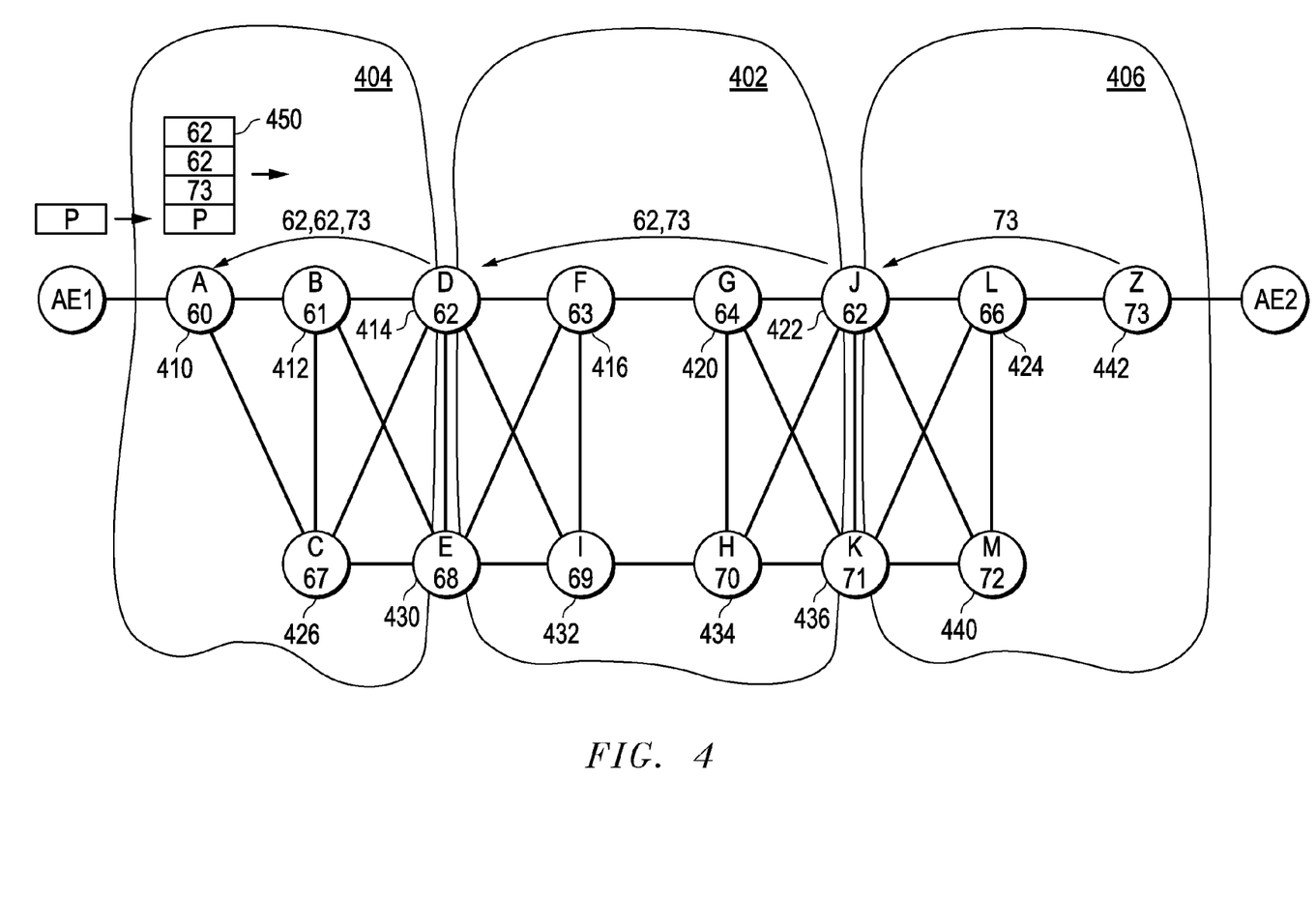
FIG. 4 is a block diagram illustrating an example provider network.

FIG. 4 illustrates a portion of a subdivided provider network 400 employing SR. Network 400 includes backbone area 402 coupled between aggregation areas 404 and 406. It is noted that additional aggregation areas (not shown) may be connected to backbone 402.

In one embodiment, nodal-segment IDs are unique in the areas in which their nodes are contained. As a result SR nodes in different areas may be assigned the same nodal-segment ID. For example, area border node 414 in area 404 is assigned nodal-segment ID 62, and area border node 422 in area 406 is also assigned nodal-segment ID 62.

Each of the areas 402-406 can implement its own IGP with SR extension. Border area nodes implement a separate instance of IGP with SR extension for each area in which they are contained. Each node in an area advertises routing information including nodal-segment IDs bound to loopbacks to the other nodes in the area in the same or similar fashion that nodes in FIG. 2 advertise their routing information. Nodes can use the routing information they receive to create SR forwarding tables for the area in which the nodes are contained in much the same fashion as described above. Area border nodes may create an SR forwarding table for each area in which they are connected.

Internal BGP with SR extension can be employed to exchange routing information between area border nodes, edge nodes (e.g., nodes 410 and 442) and/or other devices like a centralized control plane server. The routing information exchanged via internal BGP can be used by the edge nodes and/or the dedicated devices to create segment ID stacks for edge-to-edge SPs. For example, area border node 422 may establish a session with area border node 414 in which area border node 422 advertises routing information to reach edge node 442. This routing information may indicate that loopback Z (node 442), which is bound to nodal-segment ID 73, can be reached via loopback J (node 422), which is bound to nodal-segment ID 62. Area border node 414 in turn may establish a session with edge node 410 in which area border node 414 advertises routing information to reach edge node 442. This routing information may indicate that loopback Z (node 442) bound to nodal-segment ID 73, can be reached via node loopback J (node 422) bound to nodal-segment ID 62, which in turn can be reached via loopback D (node 414) bound to nodal-segment ID 62. FIG. 4 provides visual illustration of these internal BGP session communications. FIG. 4 also shows an example segment ID stack 450 created by edge node 410 for an SP to node 442 using the exchanged routing information.

4. Area-Segment IDs

Figure 5:
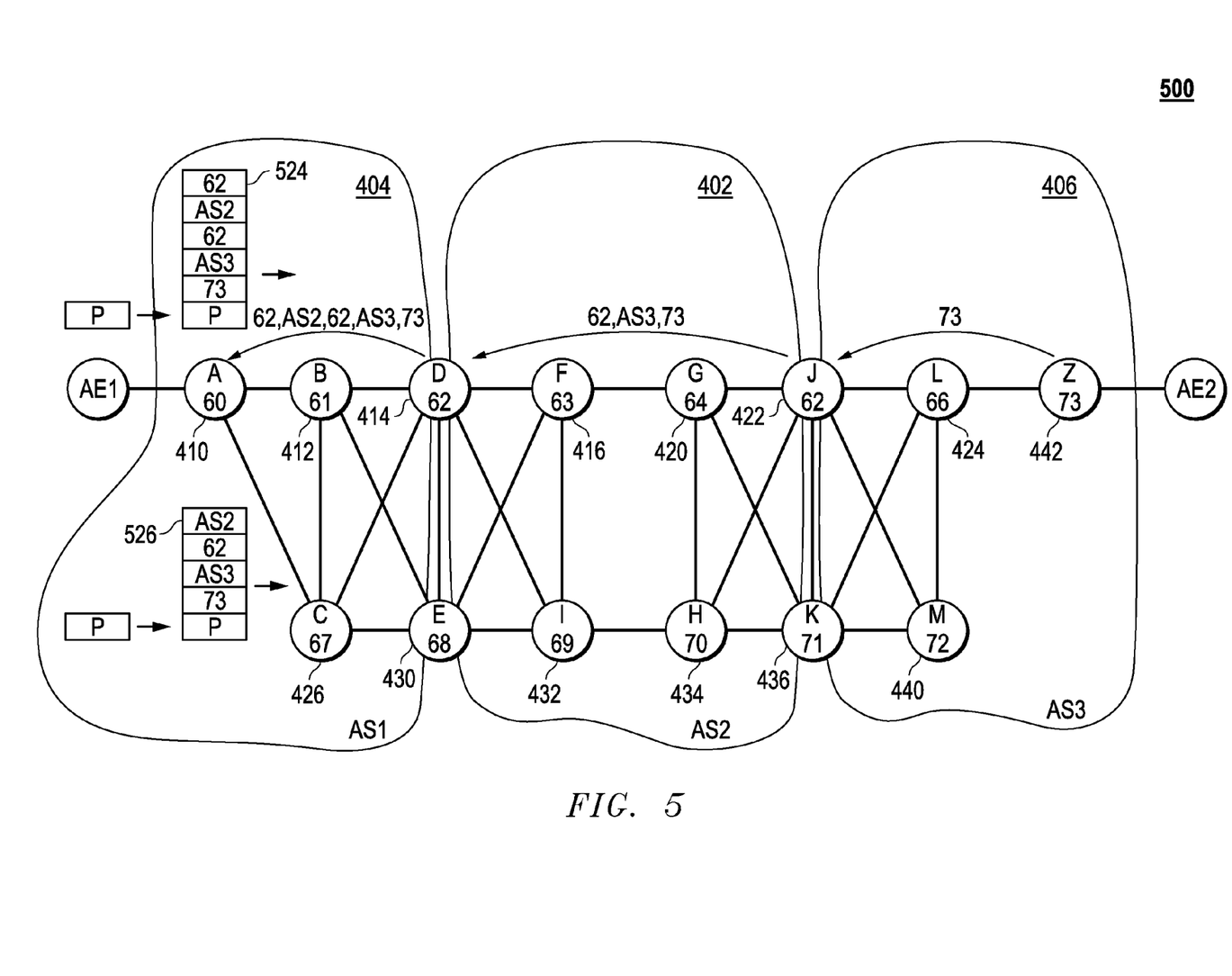
FIG. 5 is a block diagram illustrating an example provider network.

Area-segment IDs, an additional type of segment ID, can be assigned to each area in a subdivided network. Area-segment IDs are assigned so that no two areas in a subdivided network are assigned the same area-segment ID. FIG. 5 illustrates the network of FIG. 4 with area-segment IDs assigned to the areas. For example, backbone area 402 is assigned area-segment ID AS2 while aggregation areas 404 and 406 are assigned area-segment IDs AS1 and AS3, respectively.

Each node in an area can be assigned the area-segment ID for the area in which the node is contained. Each node may bind its assigned area-segment ID to its loopback. The ranges for nodal-segment IDs and adjacency-segment IDs may be different from the predefined ranges for area-segment IDs.

Area-segment IDs can be used for a variety of purposes. For example, area-segment IDs can be used to preclude forwarding errors that can arise from use of duplicate nodal-segment IDs in segment stacks. Stack 450 in FIG. 4 has duplicate segment IDs. When node 414 receives and processes packet P with attached header 450 using the process shown in FIG. 3, the duplicate segment-IDs may create a forwarding error. For example, it is possible that border area node 414 may not know which SR forwarding table it should use in step 314.

Each node in an area can use IGP with SR extension to advertise its routing information including nodal-segment IDs and area-segment IDs bound to loopbacks to other nodes in the area in the same or similar fashion as described above with reference to FIGS. 2 and 4. Area border nodes may advertise additional backbone area related routing information into the aggregation areas in which they are contained. This additional routing information may include the area border node's loopback bound to AS2, the area-segment ID of the backbone area.

Nodes in an area can use the routing information they receive to create SR forwarding tables for the area in which the nodes are contained in the same or similar fashion as described above with reference to FIGS. 2 and 4. Area border nodes may create separate SR forwarding tables: one for the aggregation area in which they are contained and one for the backbone area. Each SR forwarding table of an area border node may be linked to a respective area-segment ID. SR forwarding tables of edge and internal nodes of an aggregation area may map nodal-segment IDs and/or backbone area-segment IDs to next hop egress interfaces.

Area-segment IDs can be included in routing information exchanged between area border nodes, edge nodes and/or a centralized control plane server during internal BGP with SR extension sessions. To illustrate with reference to FIG. 5, area border node 422 may establish a session with area border node 414 in which area border node 422 advertises routing information to reach edge node 442. This routing information may indicate that loopback Z (node 442), which is bound to nodal-segment ID 73, can be reached via loopback J (node 422) which is bound to nodal-segment ID 62 and area-segment ID AS3. Area border node 414 in turn may establish a session with edge node 410 in which area border node 414 advertises routing information to reach edge node 442. This routing information may indicate that loopback Z (node 442), which is bound to nodal-segment ID 73, can be reached via node loopback J (node 422), which is bound to nodal-segment ID 62 and area-segment ID AS2, which in turn can be reached via loopback D (node 414), which is bound to nodal-segment ID 62. FIG. 5 provides visual illustration of these internal BGP session communications.

SR edge nodes and centralized control plane servers can use the routing information they receive via IGP and internal BGP sessions to create segment ID stacks for edge-to-edge SPs. These segment ID stacks may contain one or more area-segment IDs. For example, using the routing information it received during the session with area border node 414 described above, edge node 410 creates a segment ID stack 524 for an SP that extends from edge node 410 to edge node 442 via area border nodes 414 and 422.

Figure 6:
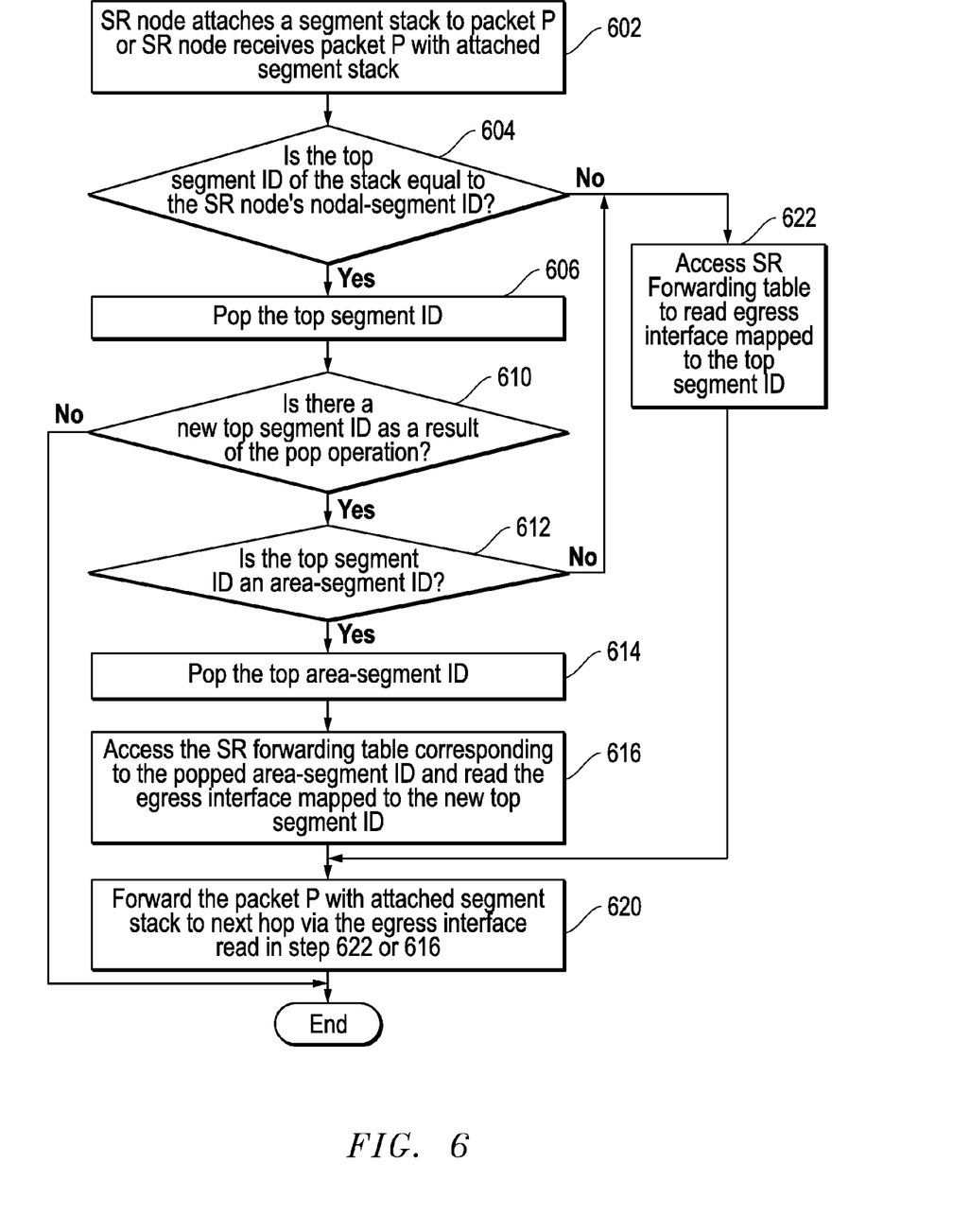
FIG. 6 is a flow chart illustrating an example process employed by a node.

In one embodiment, area-segment IDs within a stack can be used by area border nodes, such as area border nodes 414 and 422, to select the appropriate SR forwarding table to use when making packet forwarding decisions. In another embodiment, area-segment IDs within a stack can be used by internal and/or edge nodes of an aggregation area to look up next hop egress interfaces for packets. To illustrate with continuing reference to FIG. 5, FIG. 6 illustrates an example process of packet forwarding using segment IDs including area-segment IDs according to one embodiment. The process shown in FIG. 6 can be employed by nodes within the network 500. When an SR node attaches a segment stack to packet P or when an SR node receives a packet P with attached segment stack, the node in step 604 determines whether the top segment ID of the stack matches the nodal-segment ID assigned to that SR node. If there is a match, the node pops off the top segment ID, and determines whether an underlying segment ID is exposed as a new top segment ID as shown in step 606. If there is no new top segment ID, the packet P is presumably received by an egress edge node (e.g., node 442), and the packet is forwarded towards the access node based upon the packet's destination IP address and an IP forwarding table. However, if an underlying new top segment is exposed as a result of the pop operation in step 606, the SR node determines whether the new top segment ID is an area-segment ID. This can be implemented by comparing the segment ID with the predefined range of segment IDs to see if the segment ID falls within the range. If the SR node determines that the top segment is an area-segment ID, which should occur when the SR node is an area border node, the area-segment ID is popped, which in turn will expose a new segment ID. The popped area-segment ID is used to access a corresponding SR forwarding table within the area border node, and the SR node reads the egress interface mapped to the new top segment ID as shown in step 616. If it is determined in step 616 that the top segment ID is not an area-segment ID, then the SR node is presumably an internal node or an ingress edge node, and the process proceeds to step 622 where the SR node accesses its SR forwarding table to read the egress interface mapped to the top segment ID of the segment stack. Regardless of whether the access step 616 or access step 622 is performed, the packet P is forwarded with the attached segment stack the next hop via the egress interface read in step 622 or step 616 as shown in step 620. In this fashion, packets can be forwarded seamlessly between aggregation and backbone area networks of a subdivided SR network.

It is noted above that in an alternative embodiment, area border nodes advertise their loopbacks bound to the backbone area-segment ID into the aggregation. Edge and internal nodes within the aggregation area can map area-segment IDs to egress interfaces for the next hop toward the closest area border node. In this configuration, a more compact segment ID stack (i.e., less segment IDs) can be created and used for forwarding packets. To illustrate, FIG. 5 shows an alternative example segment stack 526 employing this alternative. As seen, segment stack 526 lacks the nodal-segment ID 62 assigned to area border node 414. The example forwarding process shown in FIG. 6 can be employed by the SR nodes shown within FIG. 5 using this alternative segment stack 526.

5. Access to Aggregation SR

The networks shown in FIGS. 4 and 5 enable edge-to-edge SPs between aggregation area edge nodes. Aggregation area edge nodes (hereinafter aggregation edge nodes) may be connected to access networks that are also SR enabled. An access network connects subscribers to their immediate provider network.

Figure 7:
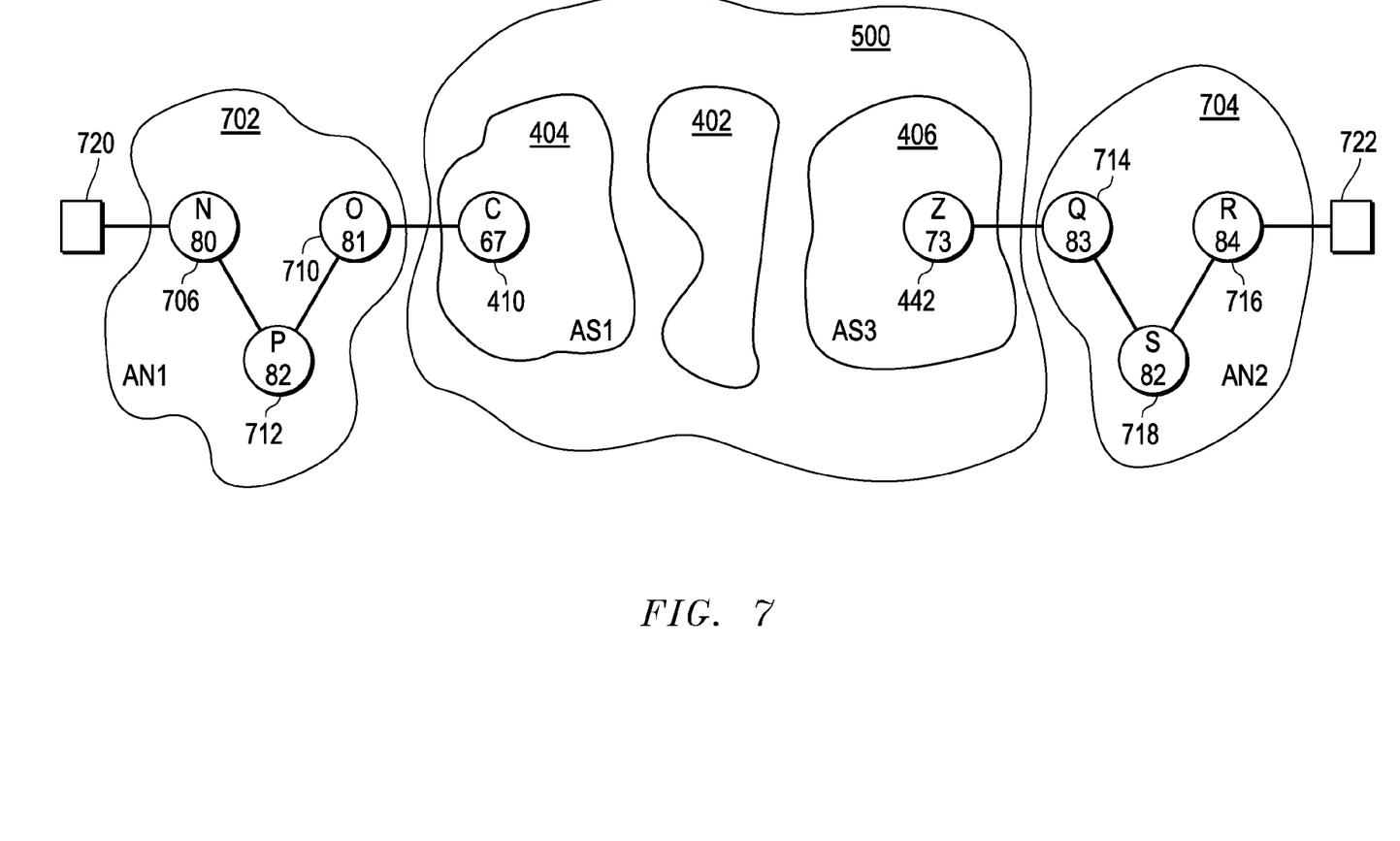
FIG. 7 is a block diagram illustrating an example provider network coupled to example access networks.

FIG. 7 illustrates the subdivided network of FIG. 5 connected between a pair of SR enabled access networks AN1 and AN2. In the embodiment shown, aggregation edge node 410 is connected to access network AN1, and aggregation edge node 442 is connected to access network AN2. It is noted additional access networks can be coupled to aggregation edge node nodes 410 and 442. Moreover, additional access networks may be coupled to areas 404 and 406 within network 500 shown in FIG. 7.

Each node is assigned a unique nodal-segment ID within an access network. These nodal-segment IDs are bound to respective loopbacks. Nodes 706-712 within an access network AN1 are assigned nodal-segment IDs 80-82, respectively, while nodes 714-718 in access network AN2 are assigned nodal-segment IDs 83-85, respectively.

Each of the access networks AN1 and AN2 can implement its own IGP with SR extension. Aggregation edge nodes implement separate instances of IGP with SR extension, one for the access network to which they are connected and one for the aggregation area in which they are contained. Access network nodes and the connected aggregation edge node exchange routing information (e.g., nodal-segment IDs bound to loopbacks). Aggregation edge nodes can advertise additional routing information into their connected access networks. This additional routing information may include the aggregation edge node's loopback bound to its nodal-segment ID and its area-segment ID. Internal BGP sessions between end nodes (e.g., node 716), aggregation edge nodes, area border nodes, and centralized control plane servers can be used to exchange additional routing information.

Nodes in an access network can use the routing information they receive to create SR forwarding tables for the access network in which they are contained in the same or similar fashion described above. Aggregation edge nodes may create separate SR forwarding tables: one for the access network they are connected to and one for the aggregation area they are contained in. The SR forwarding table for the aggregation area may be linked to the area-segment ID for that area.

Nodes within a local access networks may be incapable or otherwise not configured to create or store segment stacks for end-to-end SPs to nodes in remote access networks. For example, node 706 may lack enough memory needed to store thousands of segment stacks for SPs that extend between node 706 and destination nodes (e.g., node 716 within remote access network AN2) in remote access networks. Thus, when an access network node (e.g., node 706) receives a packet P from a device (e.g., host 720), which is destined for a remote device (e.g., host 722), the access network node may need to rely on an alternative mechanism to provide a segment stack that can be used to transmit the packet P.

In one embodiment, a centralized control plane server (not shown) can provide segment stacks to nodes of access networks. Access network nodes, such as node 706, can generate and send a request for a segment stack. The request can be sent to the centralized control plane server that is capable of providing the stack. The request should contain SP related information that is needed by the centralized control plane server to create or select an appropriate segment stack. To that end the centralized control plane server may need either the destination address for packet P or the loopback of the node (i.e., destination node) in the remote access network that is closest to the destination address. In addition, the centralized control plane server may need the loopback of the aggregation edge node connected to the access network that contains the node requesting the segment stack.

The centralized control plane server can create the needed segment stack using the SP related information provided in the request, or the centralized control plane server may access memory to read a segment stack that is mapped to the SP related information provided in the request. Either way, the centralized control plane server can reply to the request with a segment stack for an SP that extends between the aggregation edge node and the remote access network destination node identified in the request.

The requesting access network node receives the reply and attaches the segment stack contained therein to packet P. Thereafter, the access node can add the nodal-segment ID and area-segment ID for the aggregation edge node to the top of the attached segment stack so that the nodal-segment ID is the top segment ID initially. Once the two segment IDs are added to the stack, the packet and attached stack can be forwarded along the SP toward its destination. The access network node that attaches the segment stack to packet P and each node in the SP that receives the packet with segment stack can make a forwarding decision employing the process shown within FIG. 6. The aggregation edge node can use the area-segment ID added to the segment stack to select the proper SR forwarding table when the aggregation edge node receives the packet P with attached segment stack in accordance with step 616. In this fashion, packets can be forwarded seamlessly between access and aggregation area networks.

Figure 8:
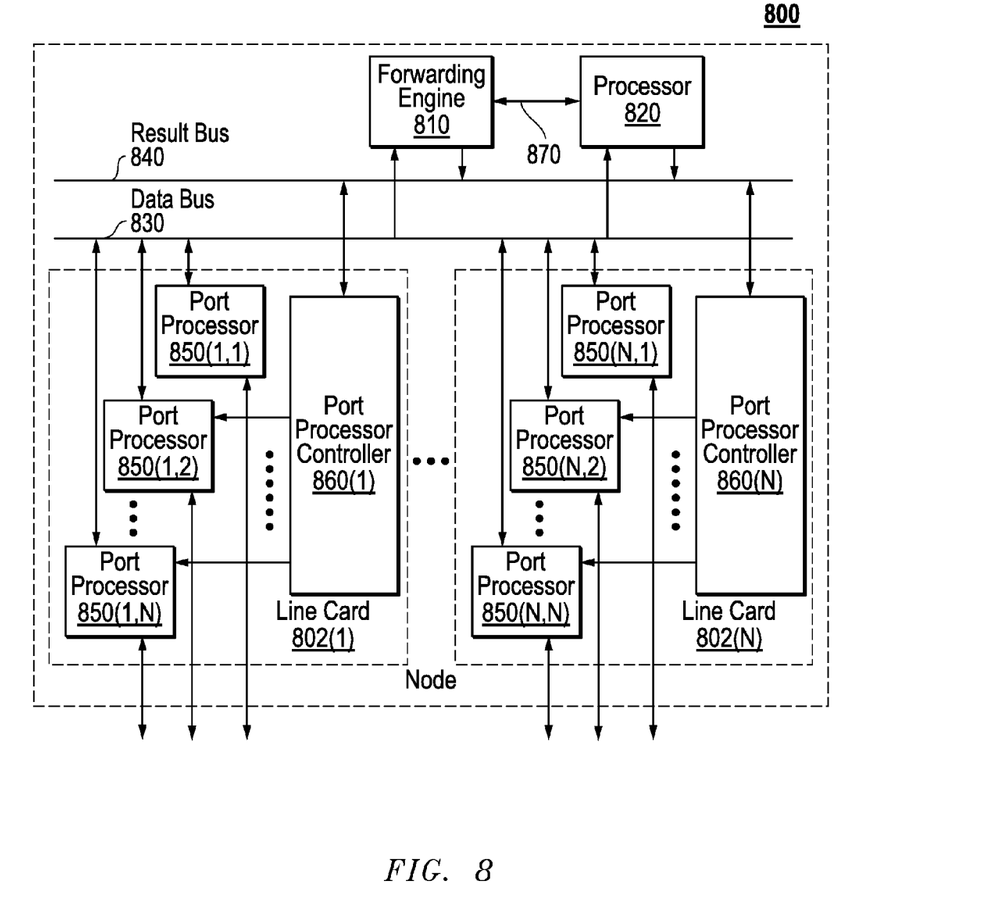
FIG. 8 is a block diagram illustrating certain components of an example node that can be employed in the networks of FIG. 4, 5, or 6.

FIG. 8 is a block diagram illustrating certain additional and/or alternative components of a node that can be employed in the networks described above. In this depiction, node 800 includes a number of line cards (line cards 802(1)-(N)) that are communicatively coupled to a forwarding engine or packet forwarder 810 and a processor 820 via a data bus 830 and a result bus 840. Line cards 802(1)-(N) include a number of port processors 850(1,1)-(N,N) which are controlled by port processor controllers 860(1)-(N). It will also be noted that forwarding engine 810 and processor 820 are not only coupled to one another via data bus 830 and result bus 840, but are also communicatively coupled to one another by a communications link 870.

The processors 850 and 860 of each line card 802 may be mounted on a single printed circuit board. When a packet or packet and header are received, the packet or packet and header with segment stack may be identified and analyzed by router 800 in the following manner. Upon receipt, a packet (or some or all of its control information) or packet and header is sent from the one of port processors 850(1,1)-(N,N) at which the packet or packet and header was received to one or more of those devices coupled to data bus 830 (e.g., others of port processors 850(1,1)-(N,N), forwarding engine 810 and/or processor 820). Handling of the packet or packet and header can be determined, for example, by forwarding engine 810. For example, forwarding engine 810 may determine that the packet or packet and header should be forwarded to one or more of port processors 850(1,1)-(N,N). This can be accomplished by indicating to corresponding one(s) of port processor controllers 860(1)-(N) that the copy of the packet or packet and header held in the given one(s) of port processors 850(1,1)-(N,N) should be forwarded to the appropriate one of port processors 850(1,1)-(N,N). In addition, or alternatively, once a packet or packet and header has been identified for processing, forwarding engine 810, processor 820 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
    receiving a packet and a segment identifier (ID) stack at a segment routing enabled node, wherein
        the segment ID stack comprises a plurality of segment IDs comprising a first area-segment ID,
        the first area-segment ID identifies a first area of a subdivided segment routing enabled network, and
        the first area comprises a first two or more nodes within the subdivided segment routing enabled network;
    selecting one of a plurality of segment routing forwarding tables based on the first area-segment ID; and
    forwarding the packet based on forwarding information contained in the selected forwarding table.

2. The method of claim 1 wherein each of the plurality of segment routing enabled forwarding tables is associated with a respective one of a plurality of area-segment IDs, including the first area-segment ID.

3. The method of claim 1 wherein:
    the segment routing enabled node comprises an area border node connected to the first area and a second area of the subdivided segment routing enabled network; and
    the second area comprises a second two or more nodes within the subdivided segment routing enabled network.

4. The method of claim 1 wherein the segment routing enabled node comprises an edge node contained in the first area, and wherein the edge node is coupled to another node in an access network.

5. The method of claim 3 wherein the plurality of segment IDs comprises a second area-segment ID that identifies the second area of the subdivided segment routing enabled network.

6. The method of claim 4 wherein:
    the plurality of segment IDs comprises a second area-segment ID that identifies a second area of the subdivided segment routing enabled network; and the second area comprises a second two or more nodes within the subdivided segment routing enabled network.

7. The method of claim 1 further comprising:
popping the first area-segment ID from the stack to expose an underlying segment ID;
accessing the selected forwarding table to read the forwarding information mapped in the selected forwarding table to the underlying segment ID.

8. The method of claim 7 wherein forwarding the packet comprises forwarding the packet and the underlying segment ID to another segment routing enabled node.

9. A non-transitory computer readable medium comprising executable instructions, wherein a method is implemented in response to executing the instructions, the method comprising:
receiving a packet and a segment identifier (ID) stack at a segment routing enabled node, wherein
the segment ID stack comprises a plurality of segment IDs comprising a first area-segment ID,
the first area-segment ID identifies a first area of a subdivided segment routing enabled network, and
the first area comprises a first two or more nodes within the subdivided segment routing enabled network;
selecting one of a plurality of segment routing forwarding tables based on the first area-segment ID; and
forwarding the packet based on forwarding information contained in the selected forwarding table.

10. The non-transitory computer readable medium of claim 9 wherein each of the plurality of segment routing enabled forwarding tables is associated with a respective one of a plurality of area-segment IDs, including the first area-segment ID.

11. The non-transitory computer readable medium of claim 9 wherein:
the segment routing enabled node comprises an area border node connected to the first area and a second area of the subdivided segment routing enabled network; and
the second area comprises a second two or more nodes within the subdivided segment routing enabled network.

12. The non-transitory computer readable medium of claim 9 wherein:
the plurality of segment IDs comprises a second area-segment ID that identifies a second area of the subdivided segment routing enabled network; and
the second area comprises a second two or more nodes within the subdivided segment routing enabled network.

13. The non-transitory computer readable medium of claim 9 wherein the method further comprises:
popping the first area-segment ID from the stack to expose an underlying segment ID;
accessing the selected forwarding table to read the forwarding information mapped in the selected forwarding table to the underlying segment ID.

14. The non-transitory computer readable medium of claim 13 wherein forwarding the packet comprises forwarding the packet and the underlying segment ID to another segment routing enabled node.

15. An apparatus comprising a segment routing enabled network node, the node comprising:
a memory for storing a plurality of segment routing forwarding tables; and
a processor adapted to
receive a packet and a segment identifier (ID) stack comprising a first area-segment ID,
select one of the plurality of segment routing forwarding tables based on the first area-segment ID, and
forward the packet based on forwarding information contained in the selected forwarding table, wherein
the first area-segment ID identifies a first area of a subdivided segment routing enabled network, and
the first area comprises a first two or more nodes within the subdivided segment routing enabled network.

16. The apparatus of claim 15, wherein each of the plurality of segment routing enabled forwarding tables is associated with a respective one of a plurality of area-segment IDs, including the first area-segment ID.

17. The apparatus of claim 15 wherein:
the segment routing enabled network node comprises an area border node connected to the first area and a second area of the subdivided segment routing enabled network; and
the second area comprises a second two or more nodes within the subdivided segment routing enabled network.

18. The apparatus of claim 17 wherein the segment ID stack further comprises a second area-segment ID that identifies the second area of the subdivided segment routing enabled network.

19. The apparatus of claim 15, wherein the processor is further adapted to:
remove the first area-segment ID from the stack to expose an underlying segment ID; and
access the selected forwarding table to read the forwarding information mapped in the selected forwarding table to the underlying segment ID.

* * * * *

UNITED STATES PATENT AND TRADEMARK OFFICE
CERTIFICATE OF CORRECTION

PATENT NO. : 9,450,829 B2
APPLICATION NO. : 14/210837
DATED : September 20, 2016
INVENTOR(S) : Clarence Filsfils et al.

It is certified that error appears in the above-identified patent and that said Letters Patent is hereby corrected as shown below:

On the Title Page

Page 2, item (56), left Column
Line 27, please replace "8,542,709" with "8,542,706"
Line 27, please replace "Kim et al." with "Wang et al."

In the Claims

Column 12
Line 45, in Claim 2, please remove the word "enabled"

Column 14
Line 29, in Claim 16, please remove the word "enabled"

Signed and Sealed this
Eighteenth Day of April, 2017

Michelle K. Lee
*Director of the United States Patent and Trademark Office*